(12) United States Patent  (10) Patent No.: US 7,051,241 B2
Lin  (45) Date of Patent: May 23, 2006

(54) SIGNAL COMPENSATION CIRCUIT OF A BUS

(75) Inventor: I-Ming Lin, Shindian (TW)

(73) Assignee: Via Technologies, Inc., Taipei (TW)

( * ) Notice: Subject to any disclaimer, the term of this patent is extended or adjusted under 35 U.S.C. 154(b) by 532 days.

(21) Appl. No.: 10/194,314

(22) Filed: Jul. 15, 2002

(65) Prior Publication Data
US 2003/0070122 A1     Apr. 10, 2003

(30) Foreign Application Priority Data
Oct. 5, 2001    (TW) ............................... 90124761 A

(51) Int. Cl.
    *G06F 11/00*    (2006.01)
(52) U.S. Cl. ................ 714/43; 324/522; 327/77; 326/30; 702/64
(58) Field of Classification Search ................ 714/43; 324/416, 522; 708/300; 326/30; 327/77, 327/179, 321, 311; 702/64, 58
See application file for complete search history.

(56) References Cited

U.S. PATENT DOCUMENTS

| | | | |
|---|---|---|---|
| 5,694,038 A * | 12/1997 | Moody et al. ............ 324/207.2 |
| 5,942,930 A * | 8/1999 | Buszko et al. ............... 327/308 |
| 5,955,889 A * | 9/1999 | Taguchi et al. ................ 326/30 |
| 6,535,945 B1* | 3/2003 | Tobin et al. ................. 710/305 |
| 6,546,507 B1* | 4/2003 | Coyle et al. ................... 714/43 |
| 6,684,350 B1* | 1/2004 | Theodoras et al. .......... 714/712 |
| 6,781,405 B1* | 8/2004 | Rajan et al. ................... 326/30 |
| 6,836,170 B1* | 12/2004 | Kitagawa et al. ............ 327/308 |
| 6,844,754 B1* | 1/2005 | Yamagata ..................... 326/30 |
| 2002/0145443 A1* | 10/2002 | Partow et al. ................. 326/30 |

OTHER PUBLICATIONS

Microsoft Press Computer Dictionary, 1997, Microsoft Press, Third Edition, pp. 357-358 and 402.*

* cited by examiner

*Primary Examiner*—Robert Beausoliel
*Assistant Examiner*—Marc Duncan
(74) *Attorney, Agent, or Firm*—Rabin & Berdo, PC

(57) ABSTRACT

A signal compensation circuit of a bus is disclosed in the present invention, wherein the amplitude of a surge is obtained by inputting a test pattern into the bus and comparing a reference voltage and a peak-value signal filtered out from the bus. For continual correction of the damping resistance, the test pattern can be inputted into the bus repeatedly to optimize the effect of the compensation. Then, a proper damping resistor is selected and connected to the bus in series to absorb the energy of the surge. The signal compensation circuit is embedded in the chip, such as in the south bridge.

18 Claims, 1 Drawing Sheet

SIGNAL COMPENSATION CIRCUIT OF A BUS

This application incorporates by reference Taiwanese application Serial No. 090124761, filed on Oct. 05, 2001.

BACKGROUND OF THE INVENTION

1. Field of the Invention

The invention relates in general to a signal compensation circuit, and more particularly to a signal compensation circuit of a bus.

2. Description of the Related Art

Nowadays, the PCI (Peripheral Component Interconnect) bus of the notebook is implemented is such layout of daisy chain due to the limited space, wherein the maximum length of the PCI bus is 12 inches. Sometimes, the signals on the PCI bus are twisted or distorted because the layout lengths of the various PCI devices, such as a PCMCIA controller, a LAN (Local Area Network), and a modem card, are different and accordingly the impedance matching are difficult to be reached. Please refer to FIG. 1, it shows the twisting of the signals on PCI buses, wherein the south bridge is connected to the PCI device (1) through PCI device (n) by a PCI bus. The serious distortion of the signal sometimes results in the system malfunction.

Besides the unmatched layout impedance, the transient state of the IC connectors, the variations of the loading, and the un-matching impedance of the PCB (printed circuit board) traces are also the reasons to cause the distortions of the signals. Therefore, it is important to adopt a proper compensating means to maintain the stable operation of the system.

Traditionally, a damping resistor is connected to the bus in series to absorb the reflection energy in order to solve the problem of the signal distortion. On the PCI bus, a damping resistor is inserted between the south bridge and the PCI devices. Then, a testing pattern is inputted to the bus, and the distortion of the signal is controlled within a tolerated range by adjusting the damping resistance. The signal quality on the PCI bus for the mass production is insured after repeatedly testing the damping resistor to select a suitable resistance.

However, the signal on the PCI bus and the loading prior to the mass production can't really reflect the mass production situation well. And the traditional method can't always eliminate the signal distortion effectively. Moreover, the number of damping resistor will be considerable large in the situation that the total lines of the signal controllers, data lines, and the address lines on the PCI bus are over 40, that not only occupy a lot of space on the PCB, but also increase the volume of the PCB, the length of the layout, and the cost of the manufacturing.

SUMMARY OF THE INVENTION

It is therefore an object of the invention to provide a signal compensation circuit of a bus with more correct damping resistance and of less PCB volume.

In accordance with the object of the invention, a signal compensation circuit is provided, which is concisely described as follows.

The signal compensation circuit comprises an input controller coupled to the bus, a peak-value filter, a comparator and a resistance-selection module. During testing, a test pattern is inputted to the bus through the input controller, and a sample pattern corresponding to the test pattern is outputted from bus. The sample pattern, a response to the test pattern on the bus, is inputted into the peak-value filter and a peak value signal, the maximum of the sample pattern, is outputted from the peak-value filter. Then, the peak-value signal is compared with a reference voltage by inputting into the comparator. Next, a comparing signal, which is produced from the comparator according to the comparison result and is an index of the signal distortion, is inputted into the resistance-selection module for choosing a proper value of damping resistance.

BRIEF DESCRIPTION OF THE DRAWINGS

Other objects, features, and advantages of the invention will become apparent from the following detailed description of the preferred but non-limiting embodiments. The description is made with reference to the accompanying drawings.

DESCRIPTION OF THE PREFERRED EMBODIMENT

In the present invention, a test pattern (TP) is firstly inputted to a bus, and a peak-value of the signal on the bus is filtered and is compared with a reference voltage to obtain the amplitude of a surge. Then, according to the amplitude of the surge, a suitable damping resistance is selected and is connected in series with the bus to absorb the energy of the surge. The circuit, which can implement the operations described above, is designed within the south bridge to avoid the consumption of the extra PCB space.

Figure 1:
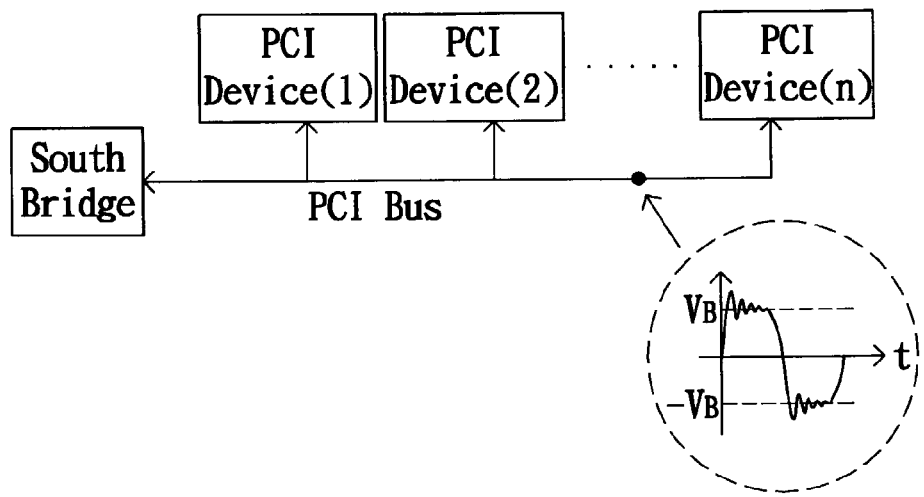
FIG. 1 shows the twisting of the signals on PCI buses of the traditional method, wherein the south bridge is connected to the PCI device (1) to PCI device (n) by PCI bus.
Figure 2:
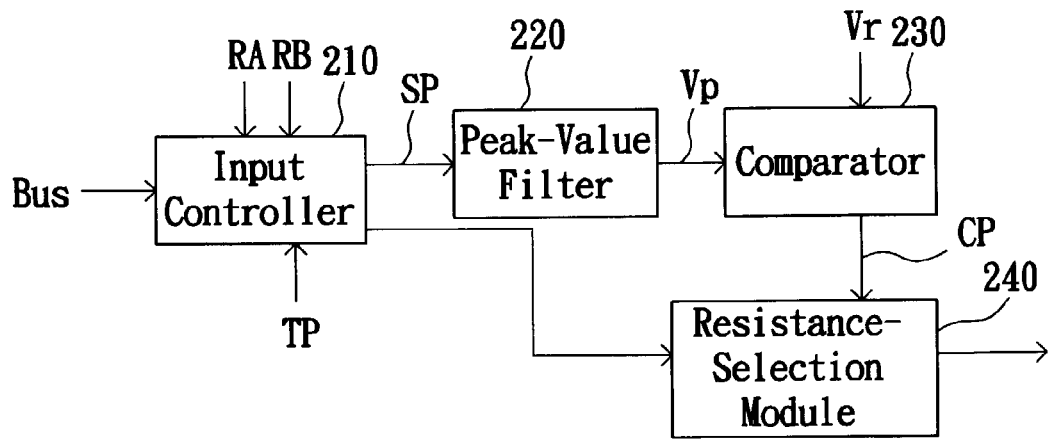
FIG. 2 shows a block diagram of a signal compensation circuit for a bus according to a preferred embodiment of the present invention.

Please refer to FIG. 2, it shows a block diagram of a signal compensation circuit for a bus according to a preferred embodiment of the present invention. Input controller 210 is coupled to the bus. A sampling pattern (SP) is obtained by inputting a test pattern (TP) into the sampling controller 210, and it should be the same TP signal on the bus.

The RA register is used to determine the source of signal and the route of signal on the bus, and is also used to count the number of TP signal, inputted into the input controller 210. The RB register is used to count the number of the SP generated. All of them will be described in details.

For the case of a PCI bus, each signal thereon has 32 bits. A register having 32 bits provides a test signal to determine the pattern of the TP, which is inputted into the PCI bus to check the quality of the signal. For the extreme case, the most serious distortion of the signal is obtained by setting all of the 32 bits as 1 or 0.

Afterwards, the SP is inputted into the peak-value filter 220 to identify the peak value Vp of the SP. Then, the peak value Vp, inputted into the comparator 230, is compared with a reference voltage Vr to obtain the amplitude of the surge, wherein the peak value is defined as the maximum of the surge. Next, a comparing pattern (CP) is outputted from the comparator 230 according to the difference of the peak value Vp and the reference voltage Vr. Finally, the CP is inputted into the resistance-selection module 240 to choose a desired damping resistance, and the damping resistance is connected to the bus.

For example, the voltage level of a reference voltage Vr is determined by a two-bit registerRB of [B1, B0]. As the register state is [0,0], the reference voltage Vr can be a base voltage Vb, such as 3.3V. As the register states are [0,1] and [1,0], the reference voltage Vr can be 0.3V and 0.7V higher than the base voltage Vb, respectively. Moreover, the reference voltage Vr can be 1V higher than the base voltage Vb if the register state is [1,1].

For a particular embodiment as shown in Table 1, the reference voltage Vr is divided into four regions: 3.3V to 3.6V, 3.6V to 4.0V, 4.0V to 4.3V, and above 4.3V. The scope of the present invention is not limited to the embodiment listed in Table 1. By dividing the voltage level of the reference voltage Vr into different regions, any other method, which varies the base voltage Vb and the size of the register signal, is within the scope of the present invention.

TABLE 1

| Register State | | |
|---|---|---|
| B1 | B0 | Reference Voltage (Vr) |
| 0 | 0 | 3.3 (base voltage, Vb) |
| 0 | 1 | 3.6 (Vb + 0.3 V) |
| 1 | 0 | 4.0 (Vb + 0.7 V) |
| 1 | 1 | 4.3 (Vb + 1.0 V) |

The peak value Vp is checked by the peak-value filter 220 and is inputted into the comparator 230 to compare with the reference voltage Vr. Depending on the region of the peak value Vp falls, the CP outputted from the comparator 230 is inputted into the resistance-selection module 240, by which the selection of a proper damping resistance is determined.

For example, the CP register can be set as 2 bits of [C1, C0]. If the peak value Vp is in the range of 3.3 to 3.6V, the CP will be set as [0,0] by the comparator 230. Then, the CP state of [0,0] is inputted into the resistance-selection module 240, and the resistance-selection module 240 outputs a desired resistance value, such as 0 Ω. As the peak value Vp is from 3.6 to 4.0V, the CP outputted from the comparator 230 is [0,1] and the resistance value outputted from the resistance-selection module 240 is 10Ω. If the peak value is located in the region of 4.0 to 4.3V the CP outputted from the comparator 230 and the resistance value outputted from the resistance-selection module 240 will be [0,1] and 33Ω, respectively. The relation between the CP and the resistance value is listed in Table 2.

TABLE 2

| CP state | | |
|---|---|---|
| C1 | C0 | Resistance (Ω) |
| 0 | 0 | 0 |
| 0 | 1 | 10 |
| 1 | 0 | 22 |
| 1 | 1 | 33 |

Therefore, a larger damping resistance can be used to absorb higher energy of the larger surge. The resistance selected by the resistance-selection module 240 is not limited to the values in Table 2. Any resistance values, which are dependent on the CP and can effectively decrease the surge phenomenon, are within the scope in the present invention.

After the damping resistance is chosen, the signal on the bus inputted into the input controller 210 bypasses to the resistance-selection module 240 directly without passing through the peak-value filter 220 and comparator 230.

The source of the signal and the route of the signal can be controlled by one single bit of the RA register, wherein the single bit of the RA register is 0 during the process of the resistance determination and it is 1 after the resistance determination is finished. As the single bit of the RA register is 0, the system of the present invention is in the testing status for the resistance determination and the signal transferred by the bus is TP. Next, the SP is outputted by the input controller 210 and is transmitted to the peak-value filter 220 after the TP is inputted to the input controller 210. Then, a suitable resistance is chosen by the operations of the comparator 230 and the resistance-selection module 240. After the resistance determination is finished, the single bit of the RA register is changed from 0 to 1. At this time, the system of the present invention is in the normal operation status, and the data of the PCI devices and the south bridge are transferred to each other through the bus.

Furthermore, the damping resistance can be selected with more precision by counting the input number of the TP, which is implemented by some bits of the RA register. For instance, 4 bit field of the 32-bit RA register can be used to determine the input number of the TP, wherein the TP can be counted into the input controller 210 for 16 times.

The RB register of the present invention can be used to determine the number of the SP. For example, 4 bit field of 32 bits bus signal can be implemented in the RB register. All 32 bits will be used to record test result after 8 times of testing.

From the above description, the circuit of the signal compensation for the bus is embedded in a chip to decrease the volume of the finished product. With much precision, the signal is compensated by connecting damping resistances to the bus in series according to the amplitude of the surge. Therefore, the finished product will become more competitive with its compactness and its less distortion of the signal.

While the invention has been described by way of examples and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal compensation circuit of a bus, comprising:
   an input controller, coupled to said bus, for inputting a test pattern into said bus and outputting a sample pattern corresponding to said test pattern from said bus, wherein said input controller determines a source of said sample pattern according to a third register;
   a peak-value filter, coupled to said input controller, for outputting a peak-value signal according to said sample pattern;
   a comparator, coupled to said peak-value filter, for outputting a comparing signal according to the difference of said peak-value signal and a reference voltage whose voltage level is selectively determined to be one of a series of discrete voltage levels in a range of voltages; and
   a resistance-selection module, connected to said bus in series, for adjusting a resistance according to said comparing signal.

2. A signal compensation circuit according to claim 1, wherein said sample pattern is at least 1 bit.

3. A signal compensation circuit according to claim 1, wherein said test pattern is determined by contents of a first register.

4. A signal compensation circuit according to claim 3, wherein said first register state has 32 bits.

5. A signal compensation circuit according to claim 1, wherein said input controller triggers the staffing of said signal compensation circuit according to a second register.

6. A signal compensation circuit according to claim 1, wherein the voltage level of said reference voltage is determined according to a fourth register.

7. A signal compensation circuit according to claim 1, wherein the voltage level of said reference Voltage is in the range of 3.3V to 4.3V.

8. A signal compensation circuit according to claim 1, wherein said bus is a PCI bus.

9. A signal compensation circuit according to claim 1, wherein the resistance-selection module selects one of a plurality of predetermined resistances according to said comparing signal, and said resistance is connected to said bus in series.

10. A signal compensation method of a bus comprising the steps of:
   inputting a test pattern into said bus and outputting a sample pattern, said sample pattern corresponding to said test pattern;
   outputting a peak-value signal according to said sample pattern;
   outputting a comparing signal according to the difference of said peak-value signal and a reference voltage whose voltage level is selectively determined to be one of a series of discrete voltage levels in a range of voltages, wherein the voltage level of said reference voltage is determined according to a second register; and
   adjusting a resistor according to said comparing signal.

11. A signal compensation method according to claim 10, wherein said sample pattern is at least 1 bit.

12. A signal compensation method according to claim 10, wherein said test pattern is determined by contents of a first register.

13. A signal compensation method according to claim 12, wherein said register has 32 bits.

14. A signal compensation method according to claim 10, wherein the voltage level of said reference voltage is in the range of 3.3V to 4.3V.

15. A signal compensation method according to claim 10, wherein said bus is a PCI bus.

16. A signal compensation method according to claim 10, wherein said resistor is connected to said bus in series.

17. A signal compensation circuit of a bus, comprising:
   an input controller, coupled to said bus, for inputting a test pattern into said bus and outputting a sample pattern corresponding to said test pattern;
   a peak-value filter, coupled to said input controller, for outputting a peak-value signal according to said sample pattern;
   a comparator, coupled to said peak-value filter, for outputting a comparing signal according to the difference of said peak-value signal and a reference voltage; and
   a resistance-selection module connected to said bus in series, for adjusting a resistance according to said comparing signal;
   wherein the voltage level of said reference voltage is determined according to contents of a register.

18. A signal compensation method of a bus comprising the steps of:
   inputting a test pattern into said bus and outputting a sample pattern, said sample pattern corresponding to said test pattern;
   outputting a peak-value signal according to said sample pattern;
   outputting a comparing signal according to the difference of said peak-value signal and a reference voltage; and
   adjusting a resistor according to said comparing signal;
   wherein the voltage level of said reference voltage is determined according to contents of a register.

* * * * *